(No Model.)
W. F. MOSS.
COMBINED PLOW AND FERTILIZER DISTRIBUTER.
No. 447,156. Patented Feb. 24, 1891.
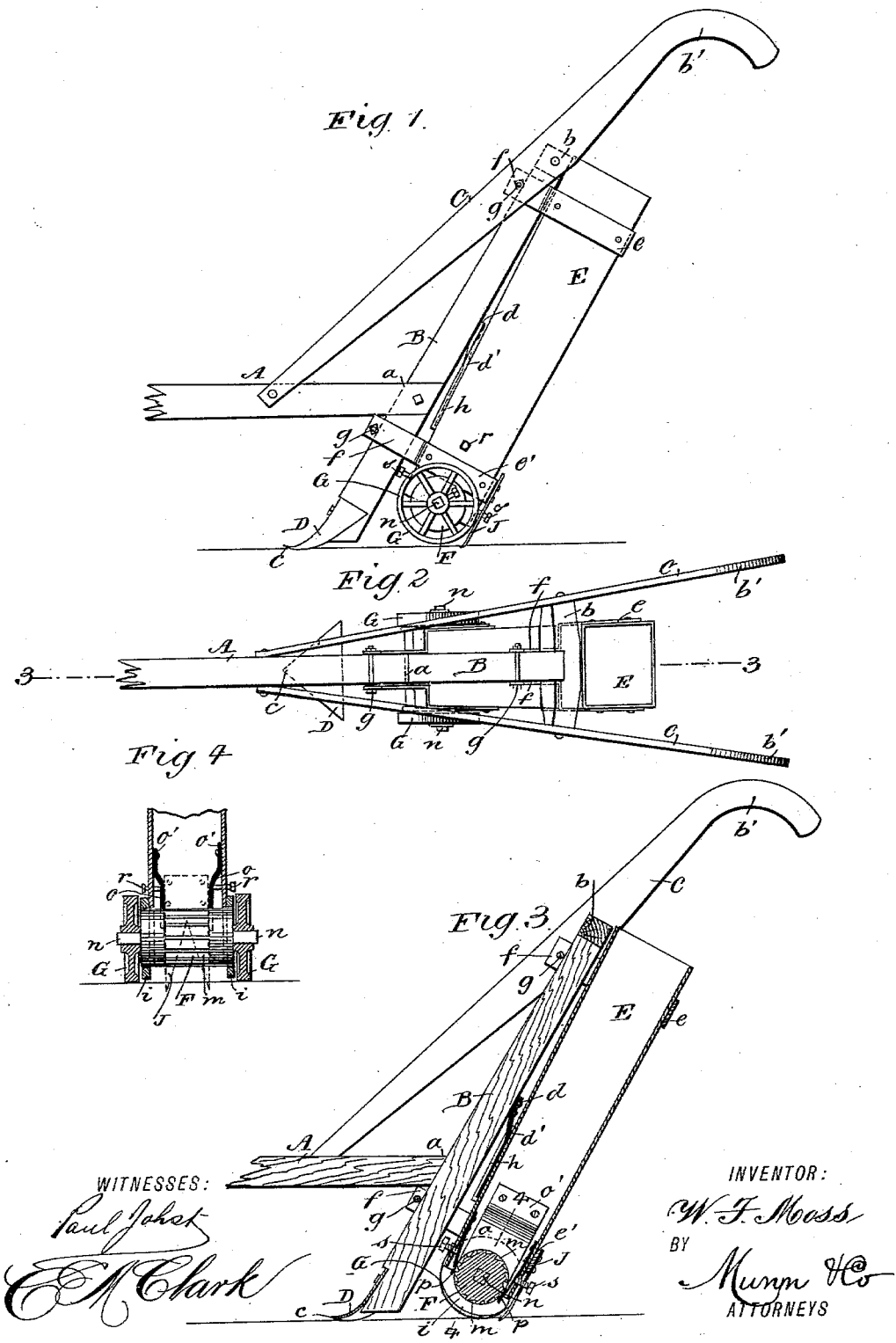

UNITED STATES PATENT OFFICE.

WILLIAM F. MOSS, OF FITZPATRICK'S, ALABAMA.

COMBINED PLOW AND FERTILIZER-DISTRIBUTER.

SPECIFICATION forming part of Letters Patent No. 447,156, dated February 24, 1891.

Application filed July 30, 1890. Serial No. 360,361. (No model.)

*To all whom it may concern:*

Be it known that I, WILLIAM F. MOSS, of Fitzpatrick's, in the county of Bullock and State of Alabama, have invented a new and useful Combined Plow and Fertilizer-Distributer, of which the following is a full, clear, and exact description.

This invention relates to an improved device for the cultivation of a growing crop and the distribution simultaneously of a fertilizing material, the object being to provide in one implement, which is cheap to construct and of compact formation, means for the cultivation of corn, cotton, potatoes, and similar crops, and at the same time for sowing powdered fertilizing compound or material and mixing the fertilizer with the soil.

To these ends my invention consists in the peculiar construction and combination of parts, as hereinafter described, and indicated in the claims.

Reference is to be had to the accompanying drawings, forming a portion of this specification, in which similar letters of reference indicate corresponding parts in all the figures.

Figure 1 is a side elevation of the implement having the front end of the beam broken. Fig. 2 is a plan view of the device shown in Fig. 1. Fig. 3 is a sectional side elevation taken on the line 3 3 in Fig. 2; and Fig. 4 is a transverse sectional elevation of a portion of the distributer, taken on the line 4 4 in Fig. 3.

A represents the beam of a single-blade shovel-plow, and B an elongated standard for the plow, which is suitably inclined to project its upper portion rearwardly and the lower part forwardly from the point $a$, where the beam and standard are secured together in alignment vertically considered.

Two handle-bars C are oppositely secured to the beam A in advance of the standard B and diverge as they incline rearwardly, a stretcher-rung $b$ being introduced between the handle-bars at a proper point distant from the curved handles $b'$, which are the upper terminals of the handle-bars.

A shovel-blade D is secured upon the lower end portion of the standard B, the blade having its lateral edges sloped upwardly, outwardly, and rearwardly on each side of the standard and the point $c$ projected in front of the upper portion of the blade, so as to freely engage the soil and loosen it.

Upon the rear face of the inclined standard B a depending tongue $d$ is secured by its upper portion, as shown in Figs. 1 and 3, the body of said tongue having an offset bend formed at $d'$ and the main lower portion extended downwardly and nearly parallel to the standard.

A hopper-box E, preferably made rectangular, of wood or metal, and of such proportionate length that its lower end will be near to the ground when the upper end portion is nearly opposite the stretcher-rung $b$ of the handle bars, is held to the standard by two bracket-loops $e\ e'$. The bracket-loops $e\ e'$ are of such a size as to closely fit upon the outside of the hopper-box E, to which they are secured by screws or other means, the loop $e$ having engagement with the hopper-box near its upper end and the loop $e'$ being located near the lower terminal of said box. The terminal end portions $f$ of the bracket-loops $e\ e'$ are bent outward to adapt them to loosely embrace the opposite sides of the standard B, and to loosely secure the hopper-box in connection with the standard, transverse bolts $g$ are inserted in holes formed in the end portion $f$ near to the front face of the standard.

In conjunction with the means just described for holding the hopper-box E in sliding connection with the standard B there is a guide-shoe $h$, fastened to the front face of the hopper-box at such a point as will permit the free entrance of the tongue $d$ within the elongated channel of the shoe, which it is adapted to loosely fit, so that the hopper-box will be retained in alignment with the body of the standard at the rear of the same and allowed to reciprocate vertically for a purpose which will be explained.

A transverse distributing-roller F is located at the lower end of the hopper-box E, and is held in revoluble connection with it by the perforated bracket-plates $i$, which loosely fit upon the body of the cylindrical roller and are attached by their upper portions to the opposite sides of the hopper-box, as shown in Fig. 4. The central portion of the cylindrical distributing-roller F is longitudinally fluted, grooves m being produced in the peripheral surface of the roller, extending in series and parallel to each other completely around the roller-body. The length of the fluted portion is less than the width of the hopper-box E, and equal smooth portions of the roller extend from the terminals of the flutes or grooves m through the sides of the box to loosely engage the apertures in bracket-plates i, as previously mentioned. Axial studs n, which are square in cross-section, extend from the ends of the roller E, or a shaft with squared ends may be inserted through an axial perforation of the roller-body, and on the square portion n two wheels G of equal diameter are securely affixed.

Within the hopper-box E two similar thin elastic plates o are adjustably secured by a bolted attachment of their upper end portions o' to the opposite sides of the box. Below the portions o' of the plates o lateral offsets are formed on said plates, which project the plates toward the center of the box equally, so that the depending portions of the plates will align with the ends of the grooves m in the roller E, the lower end portions of the plates being cut to fit upon the cylindrical surface of the roller, against which they loosely bear. The flutes m in the roller F are formed so closely as to produce intervening longitudinal ribs throughout the entire peripheral surface of the roller, against which the spring-plates o bear with sufficient force to pulverize any lumps in the fertilizer material that is fed from the hopper to the roller.

A set-screw bolt r is provided for each plate o, which bolts are adjustable in threaded perforations of the hopper-box side walls, so as to permit the bolt ends to press against the elastic depending portions of the plates and force them toward each other when the bolts are moved to effect such an adjustment. The spring-plates o are designed to regulate the width of space in the hopper-box E, immediately above the roller F, which space is the feed-throat from the box to the roller.

On the front and rear inner sides of the hopper-box E the feed-controlling spring-plates p are secured by attachment thereto of their upper end portions, the depending elastic portions of the plates having a proper set inwardly to cause their free lower ends to impinge upon the peripheral face of the roller F at opposite points, which are near the center of the roller and cover the grooves they are adjacent to. The set-screw bolts s are inserted through the side walls of the hopper-box E, having threaded engagement with the same at such points as will allow the inner ends of the bolts to impinge upon the elastic portions of plates p, and graduate the pressure of the latter upon the roller F.

Upon the exterior of the rear side of the hopper-box E a harrow-plate J is bolted or screw-fastened in such a relative position as will permit the tines formed on the plate to extend below the roller F and penetrate the soil when the device is in use.

When the implement is to be operated for plowing and fertilizing the soil near a growing crop at the same time, the hopper-box E is supplied with pulverized material, which may be any commercial fertilizer, such as guano, rock phosphate, lime, or plaster ground and mixed with cotton-seed meal.

The combined plow and distributer being drawn near to rows of corn, cotton, or potatoes will thoroughly loosen the soil in advance of the hopper-box E, which will rise and fall as the wheels G pass over undulations of the ground surface, so that the fertilizer, in powdered form, that is lodged in the grooves m of roller F, will, by its rotation and jolting movement, be deposited on the ground in a thin even layer, the tines of the harrow-plate J mixing the fertilizer composition with the soil as the work progresses.

By removal of the cross-bolts g from the ends f of the bracket-loops e e' the fertilizer attachment may be disconnected from the plow-standard B and the plow be used for the cultivation of crops alone.

Having thus described my invention, I claim as new and desire to secure by Letters Patent—

1. The combination, with a plow and a hopper-box which is self-adjusting for height on the plow, of a revoluble distributer-roller that is longitudinally grooved, means to rotate the roller as the plow moves forward, and spring-plates in the hopper-box which touch the grooved face of the distributer-roller, substantially as set forth.

2. The combination, with a shovel-plow standard and a hopper-box which is adapted to slide vertically on the standard, of a longitudinally-fluted distributer-roller, means to revolubly support the roller on the lower end of the hopper-box, wheels fixed on the ends of the roller, and spring-plates in the box which touch the grooved face of the roller, substantially as set forth.

3. The combination, with a plow-standard, a shovel-blade on the standard, a hopper-box which aligns with the standard, and bracket-loops that are adapted to removably hold the hopper-box free to slide vertically on the standard, of a fluted roller on the lower end of the hopper-box, bracket-plates fast on the box, which loosely engage the body of the roller and permit it to rotate, wheels fixed on the ends of the roller, and two adjustable spring-plates which touch the grooved face of the roller oppositely, substantially as set forth.

4. The combination, with a plow-standard, a shovel-blade on the lower end of the standard, and a depending tongue held by its upper end on the standard, of an upright hopper-box, a shoe on the hopper-box, that loosely engages the tongue on the standard, two bracket-loops fastened to the hopper-box and loosely secured on the standard, a fluted revolubly-supported distributer-roller, fixed wheels on the ends of the roller, spring-plates in the box, which touch the roller-face, and a depending harrow-plate at the rear of the hopper-box, substantially as set forth.

5. The combination, with a plow-standard, a shovel-blade on the lower end of the standard, a depending tongue on the rear face of the standard, an upright hopper-box, two bracket-loops fastened to the hopper-box and made to engage opposite sides of the standard with their end portions, cross-bolts which pass through the bracket-loop ends in front of the standard, and a shoe on the hopper-box which loosely fits onto the depending tongue on the standard, of a longitudinally-grooved distributer-roller, two bracket-plates on the lower end of the hopper-box, which loosely support the distributer-roller thereon, two opposite adjustable spring-plates within the hopper-box that bear with their spring ends on the grooved face of the roller, two spring-plates which are adjustable in and form a feed-throat for the hopper-box above the grooved roller, and a harrow-plate attached to the hopper-box behind the grooved roller, substantially as set forth.

W. F. MOSS.

Witnesses:
C. A. SHEALLY,
H. P. HUFHAM.